United States Patent
Davis et al.

(10) Patent No.: US 11,045,746 B2
(45) Date of Patent: Jun. 29, 2021

(54) SYSTEM AND METHOD FOR ASSEMBLING A LARGE SCALE CHROMATOGRAPHY STRUCTURE

(71) Applicant: Global Life Sciences Solutions USA LLC, Marlborough, MA (US)

(72) Inventors: John Davis, Hucclecote (GB); Kyril Dambuleff, Frenchtown, NJ (US); Alan M. Williams, Easton, PA (US)

(73) Assignee: Global Life Sciences Solutions USA LLC, Marlborough, MA (US)

( * ) Notice: Subject to any disclaimer, the term of this patent is extended or adjusted under 35 U.S.C. 154(b) by 481 days.

(21) Appl. No.: 15/064,438

(22) Filed: Mar. 8, 2016

(65) Prior Publication Data

US 2016/0228791 A1    Aug. 11, 2016

Related U.S. Application Data

(63) Continuation of application No. 12/663,750, filed as application No. PCT/US2008/067338 on Jun. 18, 2008, now abandoned.

(60) Provisional application No. 60/946,404, filed on Jun. 27, 2007.

(51) Int. Cl.
*B01D 15/22* (2006.01)
*G01N 30/60* (2006.01)
*B01D 15/14* (2006.01)

(52) U.S. Cl.
CPC ............. *B01D 15/22* (2013.01); *B01D 15/14* (2013.01); *G01N 30/6091* (2013.01); *Y10T 29/49826* (2015.01)

(58) Field of Classification Search
CPC .... B01D 15/14; B01D 15/22; G01N 30/6091; Y10T 29/49826
See application file for complete search history.

(56) References Cited

U.S. PATENT DOCUMENTS

| | | | |
|---|---|---|---|
| 2,323,830 A | 7/1943 | McMillan | |
| 3,265,214 A * | 8/1966 | Brodsky | ............... G01N 30/94 210/198.3 |
| 4,151,092 A | 4/1979 | Grimm | |
| 4,350,586 A | 9/1982 | Conlon et al. | |
| 4,496,461 A | 1/1985 | Leeke et al. | |
| 4,578,187 A | 3/1986 | Alhauser | |

(Continued)

FOREIGN PATENT DOCUMENTS

| | | |
|---|---|---|
| CN | 204699732 U * | 10/2015 |
| FR | 2681138 | 3/1993 |

OTHER PUBLICATIONS

PTO Translation No. 12-3140 of French Patent No. 2,681,138, pp. 1-14, Apr. 2012.

*Primary Examiner* — Latosha Hines
(74) *Attorney, Agent, or Firm* — Eversheds Sutherland (US) LLP

(57) ABSTRACT

A container system is disclosed, where the container system includes a housing. A chromatography cartridge is disposed in the housing. A structural support in the housing is configured to retain the chromatography cartridge within the housing. The housing is configured to withstand a certain amount of pressure generated inside the chromatography cartridge. The chromatography cartridge is disposed in the housing either in horizontal or in vertical position.

9 Claims, 4 Drawing Sheets

(56) References Cited

U.S. PATENT DOCUMENTS

| | | | |
|---|---|---|---|
| 4,627,918 A * | 12/1986 | Saxena | B01D 15/1807 |
| | | | 210/656 |
| 4,675,104 A | 6/1987 | Rai et al. | |
| 4,676,898 A * | 6/1987 | Saxena | B01D 15/14 |
| | | | 210/198.2 |
| 4,692,246 A | 9/1987 | Simon | |
| 5,221,473 A | 6/1993 | Burrows | |
| 5,431,813 A | 7/1995 | Daniels | |
| 5,562,824 A | 10/1996 | Magnusson | |
| 6,001,253 A | 12/1999 | Conroy et al. | |
| 6,136,189 A | 1/2000 | Smith | |
| 6,444,122 B1 | 9/2002 | Davelaar | |
| 6,998,273 B1 | 2/2006 | Fleming et al. | |
| 7,001,550 B2 | 2/2006 | Van Reis | |
| 7,074,331 B2 | 7/2006 | Allington et al. | |
| 7,452,464 B2 | 11/2008 | Uselius et al. | |
| 2003/0098280 A1 | 5/2003 | Davis | |
| 2003/0102266 A1 | 6/2003 | Ritacco | |
| 2003/0173279 A1 | 9/2003 | Aste | |
| 2004/0129617 A1 | 7/2004 | Tanner et al. | |
| 2004/0164012 A1 | 8/2004 | Dunkley et al. | |
| 2006/0011532 A1 | 1/2006 | Van Davelaar | |
| 2006/0070950 A1 | 4/2006 | Rasmussen et al. | |
| 2006/0213822 A1 | 9/2006 | DeMarco | |
| 2006/0273012 A1 | 12/2006 | Dehmer | |
| 2007/0119770 A1 | 5/2007 | Suzuki et al. | |
| 2008/0164195 A1 | 7/2008 | Siwak | |
| 2009/0230045 A1 | 9/2009 | Kaneko et al. | |

* cited by examiner

SYSTEM AND METHOD FOR ASSEMBLING A LARGE SCALE CHROMATOGRAPHY STRUCTURE

CROSS-REFERENCE TO RELATED APPLICATIONS

This application is a continuation of U.S. application Ser. No. 12/663,750 that under 35 U.S.C. § 371 claims priority to international patent application number PCT/US2008/067338 filed Jun. 18, 2008, published on Dec. 31, 2008, as WO 2009/002780, which claims priority to U.S. provisional patent application No. 60/946,404 filed Jun. 27, 2007; the disclosure of which is incorporated herein by reference in its entirety.

FIELD OF THE INVENTION

The present invention relates to a system and method for assembling a large-scale chromatography structure.

BACKGROUND OF THE INVENTION

Generally, purification by liquid chromatography is a process of separation of one or more liquid components from all other liquid components of a mixture. Large-scale liquid chromatography is currently the biotech industry's most widely utilized, if not the only, means of purification of biopharmaceuticals. Such purification is necessary in order to separate the therapeutic component of interest from all other impurities with which it coexists during the process of manufacture.

Large-scale chromatography is carried out in cylindrical vessels, termed columns, which are packed with a chromatography medium itself comprising of porous microscopic spherical particles. In a typical purification procedure, the liquid mixture containing the therapeutic product of interest is pumped through the column where the therapeutic binds to and is retained by the chromatography medium while the undesirable impurities flow through and out of the column without binding. The therapeutic product is thus separated out of the mixture, i.e. it has been purified. The therapeutic product can later be unbound from the chromatography medium and extracted, or eluted, from the column. Normally, a large-scale purification process utilizes 3 or 4 different columns packed with different chromatography media in order to obtain the required high degree of purity.

In the industry, when a packed bed of media contained within a column has been used several times to purify several batches of the therapeutic product, the chromatography medium may become incapable of performing the purification and therefore must be taken out and replaced. The process of removing the spent chromatography medium from the column is called unpacking. Similarly, the process of filling the same column with new chromatography medium is called packing. Therefore, the column itself can be viewed as a fixed piece of equipment whereas the chromatography medium is viewed as a consumable.

Currently, the chromatography columns utilized by the industry need to be unpacked and repacked frequently. Such unpacking and repacking is always carried out on site and is performed by operators who are trained and highly skilled in the art. Also, these operators may require specialized training and a high skill level to unpack and repack chromatography columns. The packing of a column with chromatography medium is a critical a crucial process because it is the quality of the packed bed of medium that will determine how well the column will perform the separation. A poorly packed column will not perform the separation task assigned to it. Furthermore, a poorly packed column becomes unstable and its performance is unpredictable and inconsistent—a highly undesirable state of affairs.

To ensure consistency and reproducibility of column performance, every newly packed column is subjected to an evaluation test, or a battery of tests, whose objective is to determine whether or not the column can perform the separation expected of it. There are two commonly used parameters for measuring a column's performance: 1) HETP (Height Equivalent to a Theoretical Plate) and 2) Asymmetry. HETP is, in essence, a measure for the efficiency with which the column can perform the separation. The asymmetry is in a way a measure of the uniformity of the packed medium, which in itself determines how evenly the process liquid will flow though the column.

Due to the complexity of packing procedures and the skills required to perform the packing, newly packed columns in the biotech industry frequently fail the evaluation tests. Such columns need to be unpacked, repacked and tested. These three processes are lengthy and costly. More importantly, repeated packing and unpacking cause unnecessary delays in manufacturing of valuable therapeutic products. Ultimately, this results in reduced quantities of product manufactured annually and subsequently to a substantial revenue loss. Therefore, there is a need for a product, which can greatly reduce the uncertainties and failures from on site packing.

SUMMARY OF THE INVENTION

The present invention has been accomplished in view of the above-mentioned technical background, and it is an object of the present invention to provide a system and method for assembling a large-scale chromatography structure.

In a preferred embodiment of the invention a container system is disclosed, where the container system includes a housing. A chromatography cartridge is disposed vertically in the housing. A structural support in the housing is configured to retain the chromatography cartridge within the housing. The housing is configured to withstand a certain amount of pressure generated inside the chromatography cartridge.

In another preferred embodiment of the invention another container system is disclosed that includes a housing. A chromatography cartridge is disposed horizontally in the housing. A structural support in the housing is configured to retain the chromatography cartridge within the housing. The housing is configured to withstand a certain amount of pressure generated inside the chromatography cartridge.

In yet another preferred embodiment of the invention, a method for assembling a chromatography structure is disclosed that includes: providing a housing, wherein the housing is configured to open, wherein the housing is configured to withstand a certain amount of pressure; inserting a cartridge into the housing; and securing the cartridge in the housing.

BRIEF DESCRIPTION OF DRAWINGS

These and other advantages of the present invention will become more apparent as the following description is read in conjunction with the accompanying drawings, wherein.

DETAILED DESCRIPTION OF THE INVENTION

The presently preferred embodiments of the invention are described with reference to the drawings, where like components are identified with the same numerals. The descriptions of the preferred embodiments are exemplary and are not intended to limit the scope of the invention.

Figure 1:
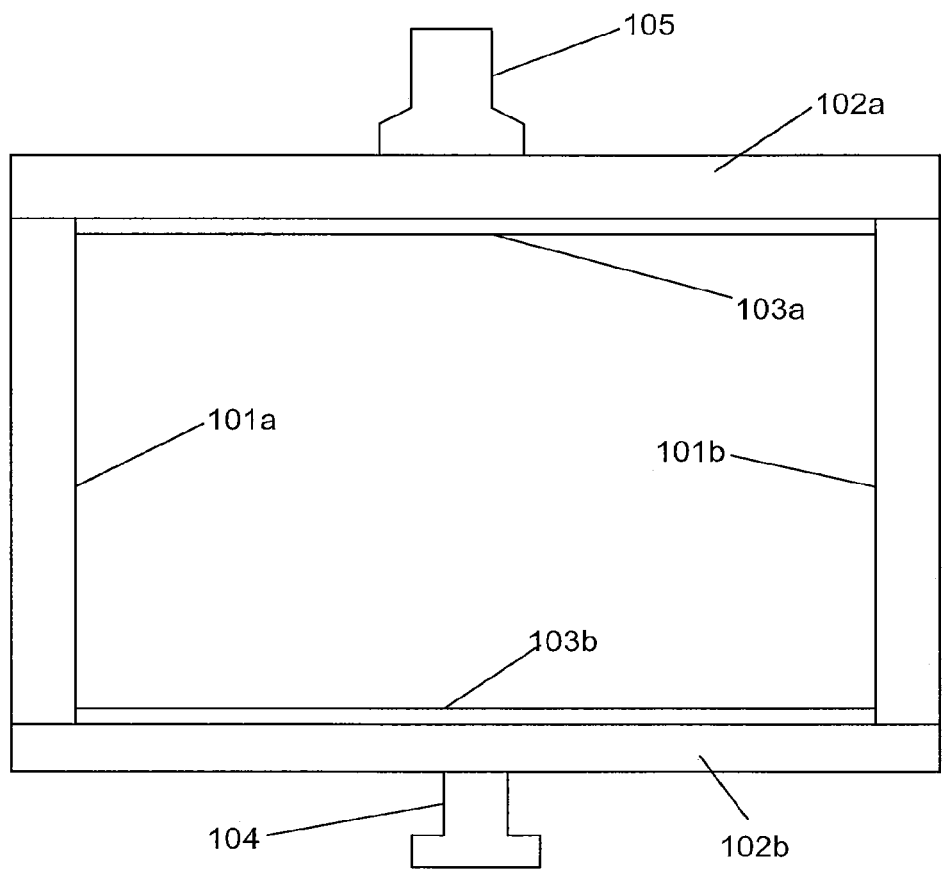
FIG. 1 illustrates a block diagram of a large scale chromatography cartridge in accordance with the invention.

FIG. 1 illustrates a block diagram of a chromatography cartridge 100. The chromatography cartridge 100 includes a left tube wall 101a, a right tube wall 101b, a top distributor 102a, a bottom distributor 102b, a top bed support 103a, a bottom bed support 103a, an inlet port 104 and a packing device 105. The inlet port 104 may also be a mobile phase inlet port. Packing device 105 may be a packing device nozzle.

Figure 2:
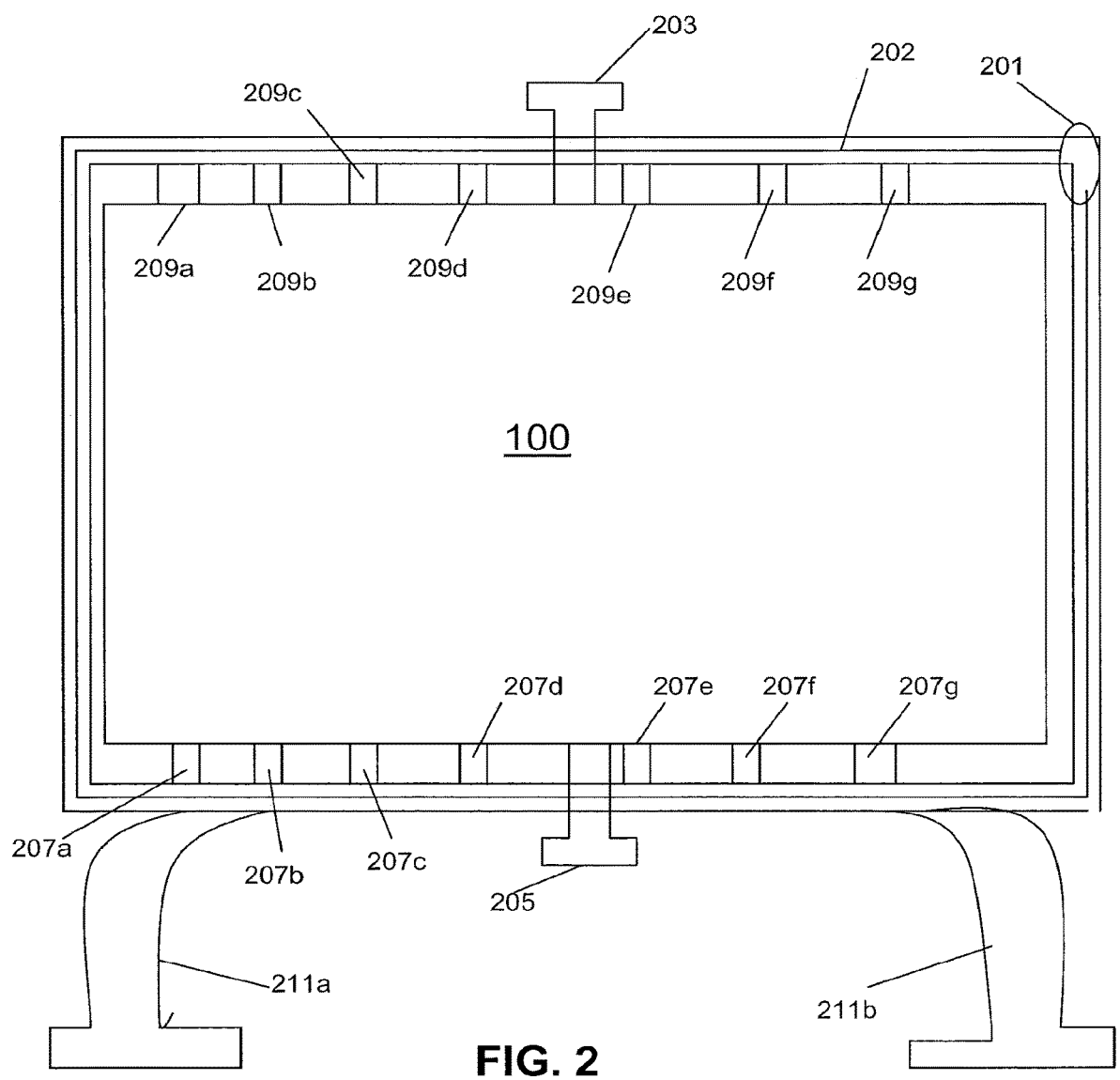
FIG. 2 illustrates a block diagram of a housing for the large-scale chromatography cartridge of FIG. 1 in accordance with the invention.
Figure 3:
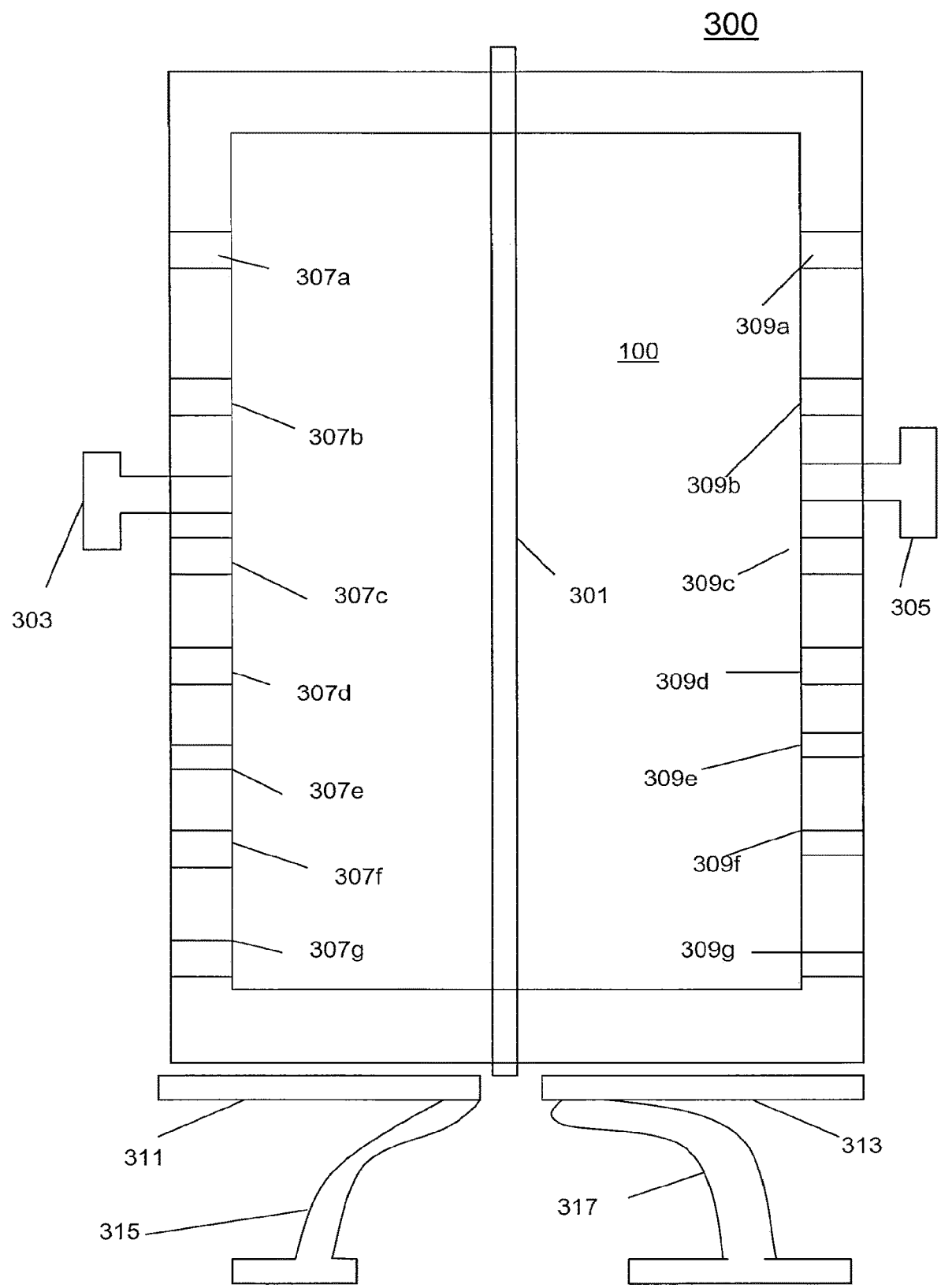
FIG. 3 illustrates a block diagram of another housing for the large-scale chromatography cartridge of FIG. 1 in accordance with the invention.

Cartridge 100 is a self-contained device or pre-packed disposable cartridge that is packed with typical chromatography media under controlled conditions, tested and certified it constitutes a ready-to-process disposable chromatography column. When in operation this cartridge is contained in a suitable mechanical framework or housing that conforms to international pressure-vessel codes and standards. This cartridge is intended for industrial applications in the biopharmaceutical, food and beverage, and other industries where chromatography is utilized in conventional columns. The cartridge is manufactured in sizes representative of industry standards and ranging in diameter from 400 to 2000 MM. The cartridge 100 is placed in the housing 200 as shown in FIG. 2, and is positioned in a way which provides for a flow direction through the packed bed of chromatography media from top to bottom or bottom to top. When positioned in such a way, cartridge 100 is said to be in a horizontal position. Alternatively, the cartridge 100 is placed in the housing 300 as shown in FIG. 3 and is positioned in a way, which provides for a flow direction through the packed bed of chromatography media from side to side, i.e. from left to right or from right to left. When positioned in such a way, cartridge 100 is said to be in a vertical position. The vertical position of the cartridge 100 is a desired position where the floor area is limited and lifting devices are unavailable as the cartridge 100 is rolled into position.

Packing device 105 is a typical packing device or packing nozzle that sits on top the cartridge 100. This packing device 105 is a removable element that gives access to the interior of the cartridge 100 for the introduction of and packing of typical chromatography media between the top bed support 103a and bottom bed support 103b. The distributors 102a and 102b are utilized to provide equal flow over the entire cross section of the packed cartridge 100. Bottom bed support 103a and the top bed support 103b are seated to the bottom distributor 102a and top distributor 102b. The purpose of the bottom bed support 103a and the top bed support 103b is to contain the chromatography medium within the cartridge 100 but allows the flow of liquid through. The bed supports 103a and 103b are made from woven material with controlled pore size made from either plastic or metal.

These typical distributors 102a and 102b are fixed and sealed to the standard tube walls 101a and 101b. The tube walls 101a 101b are utilized to contain the packed chromatography media in the chromatography cartridge 100 and have the appropriate strength to contain the packed chromatography media. Also, the tube walls 101a and 101b may have a cylindrical, rectangular or any kind of shape and are made from acrylic, polypropylene, polyethylene, other suitable class VI plastics, metal, or other suitable materials accepted by the industry. Distributors 102a and 102b could be all or in part included within the cartridge 100 insert or as stand alone piece as can the bed supports 103a and 103b When the cartridge 100 is filled with the packed chromatography media, then the packing device 105 can be removed and replaced with a mobile phase port similar to the inlet port 104. The inlet port 104 is utilized to provide a pathway for pumping liquids into or out of the/cartridge via the bottom distributor 102b and the bed support 103b.

FIG. 2 shows a housing with the large scale chromatography cartridge of FIG. 1. Housing 200 includes a 201, a lid 202, a first mobile phase port 203, a second mobile phase port 205, the large-scale chromatography cartridge 100, rib 207a, rib 207b, rib 207c, rib 207d, rib 207e, rib 207f, rib 207g, rib 209a, rib 209b, rib 209c, rib 209d, rib 209e, rib 209f, rib 209g, left leg 211a and right leg 211b. Hinge 201 is utilized to open housing 200 to insert the chromatography cartridge 100 into the housing 200 and the hinge 201 is utilized to release the chromatography cartridge 100 from the housing 200. Hinge 201 is utilized to open and close the lid 20 that retains the chromatography cartridge 100 in housing 200. The first mobile phase port 203 is utilized to receive the pumped liquids into the chromatography cartridge 100 and the second mobile phase port 205 is for releasing the pumped liquids from the cartridge 100. A nozzle or packing device shown) may be placed on top of the housing 200 to transfer chromatography media into the cartridge 100. In another embodiment of the invention after packing the cartridge 100 with chromatography media, the first mobile phase port 203 or the second mobile phase port 205 may be attached to a disposable expansion device (not shown), which allows for any liquid expansion during transit of the cartridge 100. Ribs 207a-f and ribs 209a-g are utilized to provide structural support for the cartridge 100 to retain the cartridge 100 in the housing 200. Legs 211a and 211b are utilized as support to carry or stabilize the chromatography cartridge 100.

The housing 200 is constructed of a metal such as stainless steel or another suitable material or combination of suitable materials. This housing will conform to internationally accepted pressure level codes and standards and will be capable of containing the forces generated within the cartridge 100 during operation of the cartridge 100. Housing 200 is capable of withstanding a pressure of less than 3 bar (45 psi). As shown in FIG. 2, the chromatography cartridge 100 is positioned inside the housing where the process liquids flow from the first mobile phase port 203 to the second mobile phase port 205. In another embodiment of the invention, the process liquids may flow from the second mobile phase port 205 to the first mobile phase port 203. Cartridge 100 is disposable whereas the housing 200 is not. When the cartridge 100 expires or has been used for a predetermined number of cycles, the lid of the housing 200 is opened. The cartridge 100 is then removed and a new cartridge is inserted into the housing 200, then the lid is closed and the system is ready for operation. Since the housing 200 does not come into contact with the product (I.E. the biopharmaceutical or drug) it does not need to be made from materials which must meet relevant FDA regulations.

FIG. 3 shows another housing with the large scale chromatography cartridge of FIG. 1. Housing 300 includes a central flange 301, a first mobile phase port 303, a second mobile phase port 305, the large-scale chromatography cartridge 100, rib 307a, rib 307b, rib 307c, rib 307d, rib 307e, rib 307f, rib 307g, rib 309a, rib 309b, rib 309c, rib 309d, rib 309e, rib 309f, rib 309g, left rail 311, right rail 313, left leg 315 and right leg 317. Housing 300 is equivalent to housing 200 so a description of housing 300 will not be described herein. Central flange 301 is utilized to open housing 300 to insert the chromatography cartridge 100 into the housing 300 and the central flange 301 is utilized to release the chromatography cartridge from the housing 300. The central flange 301 may be a bolt or clamp used to retain the cartridge 100 in housing 300.

The components first mobile phase port 303 and second mobile phase port 305 are equivalent to their counterparts first mobile phase port 203 and the second mobile phase port 205 described above so a description will not be included herein. Ribs 307a, 307b, 307c, 307d, 307e, 307f and 307g are equivalent to ribs 207a, 207b, 207c, 207d, 207e, 207f and 207g described above so a description will not be included herein. Ribs 309a, 309b, 309c, 309d, 309e, 309f, 309g are equivalent to ribs 209a, 209b, 208c, 209d, 209e, 209f and 209g described above so the description will not be included herein. Rail 311 and rail 313 are utilized to allow the two sides of the housing, the left side and the right side, to slide away from each other and thus provide an opening through which cartridge 100 can be inserted and removed from the housing 300. Legs 315 and 317 operate in the same manner as left leg 211a and right leg 211b to support the cartridge 100 in the respective housing 300 and housing 200.

For this housing 300, the chromatography cartridge 100 is positioned in a vertical state. This positioning of the chromatography cartridge 100 enables the process liquids to flow from the first mobile phase port 303 to the second mobile phase port 305 in a left to right motion instead of a top down motion as the cartridge 100 in FIG. 2. Referring to FIG. 3, in another embodiment of the invention, the process liquids may flow in a right to left motion in the cartridge 100 in housing 300. Housing 300 is constructed front the same materials as housing 200.

The advantages of using housing 300 are: 1. it occupies significantly less floor space; and does not require use of hoists or other lifting devices for removing and inserting cartridges. When expired or used cartridge 100 needs to be removed, the center flange 301 is unbolted or unclamped, and then the two halves of the housing 300 slide open along the rails 311 and 313. The old cartridge 100 is then rolled out and the new cartridge is rolled in.

Figure 4:
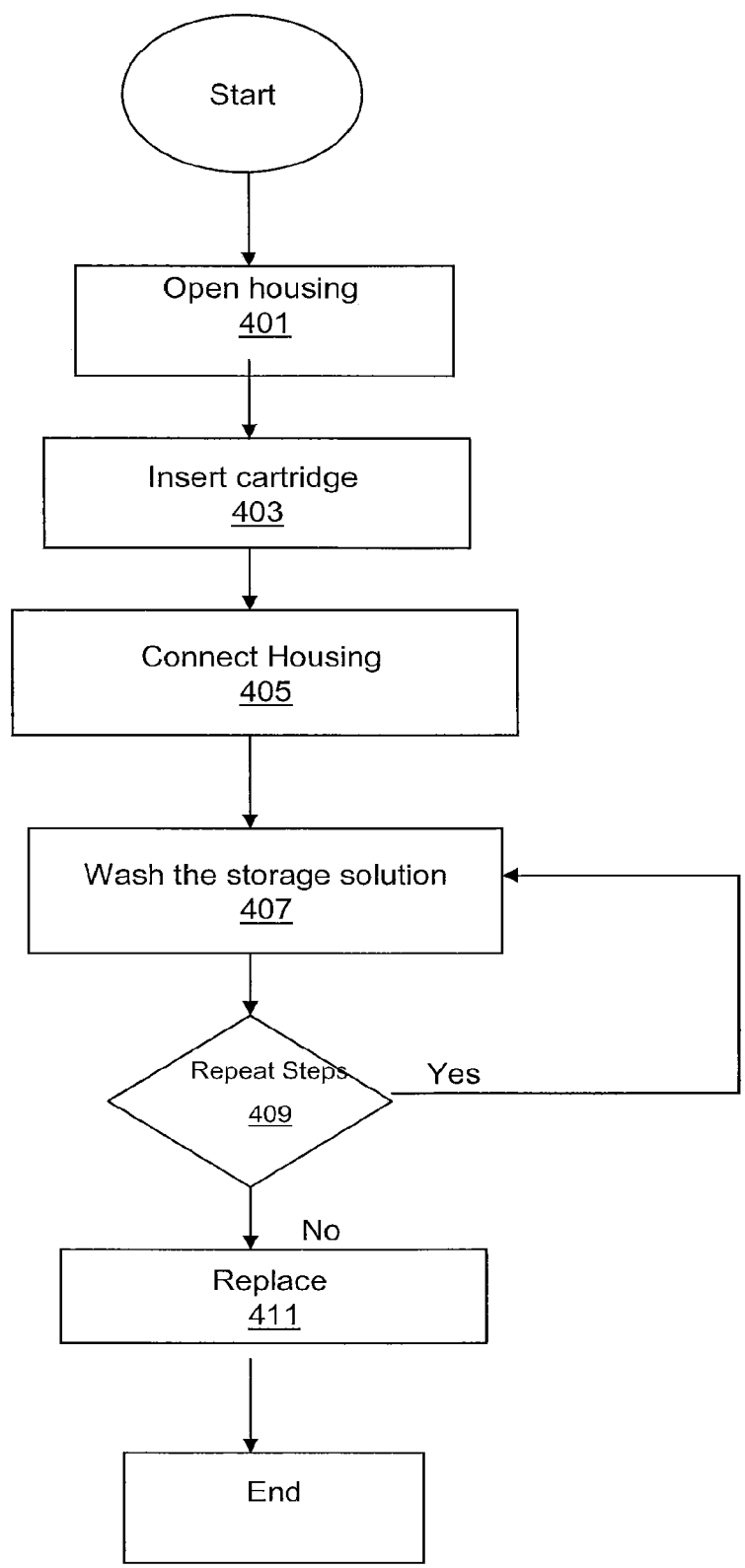
FIG. 4 is a flow-chart that of how the large-scale chromatography cartridge of FIG. 1 is inserted into the housing in accordance with the invention.

FIG. 4 shows a flow-chart of how the cartridge is inserted into the housing. At block 401, a user opens the housing 200 (FIG. 2). Housing 200 is opened when the user opens the lid 201. In another embodiment of the invention, the user opens up the housing 300 (FIG. 3) by unbolting or unclamping the center flange 301 and sliding the two halves along rails 311 and 313. Referring to FIG. 4, when the housing 200 is open then the user at block 403 can insert the chromatography cartridge 100 into the housing 200. Cartridge 100 typically includes a storage solution that is used for the prevention of bacterial growth in the cartridge when the cartridge 100 is in transit to the user. The storage solution may be 20% ethanol, an antimicrobial agent, weak benzyl alcohol solution or a weak caustic solution. The cartridge 100 is secured in the housing 200 by the multiple ribs 209a-g and 207a-g and then the housing is closed when the lid 201 is closed. In another embodiment of the invention, the housing 300 (FIG. 3) is opened, and then the user inserts the chromatography cartridge 100 into the housing 300. The cartridge 100 is secured in the housing 300 by the multiple ribs 309a-g and 307a-g and then the housing 300 is closed when the center flange 301 is bolted or clamped.

At block 405, the user connects the chromatography structure as shown FIG. 2 or FIG. 3, to a liquid processing unit. The standard liquid processing unit includes: a skid, sanitary hoses, sanitary clamps and gaskets. Mobile phase ports 203 and 205 are connected to the standard skid. Housing 200 and cartridge 100 are designed in such a way that when the lid 201 is closed the mobile phase ports 203 and 205 will be accessible so the necessary connections to the liquid processing unit, i.e. the skid, can be easily made. At block 407, the user washes a storage solution (20% ethanol) out of the cartridge 100 by utilizing a water or buffer that is transferred through the liquid processing unit and mobile phase port 203 through the cartridge 100 out of the mobile phase port 205. In another embodiment of the invention, at block 407 the user washes the storage solution out of the cartridge 100 by utilizing a water or buffer that is transferred through the mobile phase port 303 through the cartridge 100 and out of the mobile phase port 305. Optionally, the user may test the washed cartridge to verify test results provided by the manufacturer of the cartridge in the certificate of analysis. The cartridge 100 is ready for use by the user.

Next, at block 409 the user determines if the cartridge 100 can be used again. If it is determined that it can be used again then the process returns to block 407, if the cartridge 100 can not be used again then at block 411 the cartridge 100 is removed from the housing 200. After the user removes cartridge 100 by taking the cartridge 100 out of housing 200 by opening the lid 201 and removing the cartridge 100, then this process ends. In another embodiment of the invention, when the user removes the cartridge 100 from the housing 300 by unbolting or unclamping the central flange and removing the cartridge 100, then the process ends. The user may insert a new cartridge in the housing 200. In another embodiment of the invention, the user may insert a new cartridge in the housing 300.

This invention provides a system and method for assembling a large-scale chromatography structure. This large-scale chromatography structure provides the user with an immediately available and fully functioning cartridge that the user can use without worry about the complexity of packing it and using it. Thus, the user can avoid repeated packing and unpacking that cause unnecessary delays in manufacturing valuable therapeutic products. Also, this large-scale chromatography structure is able to withstand pressures that may be exerted on the cartridge as the cartridge undergoes testing. Thus, this invention provides the user with a simple product that can eliminate all failures and uncertainties of on-site column packing and testing.

Although the present invention has been described above in terms of specific embodiments, many modification and variations of this invention can be made as will be obvious to those skilled in the art, without departing from its spirit and scope as set forth in the following claims.

What is claimed is:

1. A chromatography housing system for housing one chromatography cartridge,
the housing system comprising:

a housing comprising a first side and a second side opposite to the first side sandwiching a cavity therebetween, a first port positioned on the first side and a second port positioned on the second side each side having a top and a bottom, and a plurality of ribs on the first side and the second side and configured to be in contact with and provide structural support for the one cartridge disposed in the cavity, wherein the system is configured for process liquids to flow from the first port to the second port or vice versa through the cartridge via respective first and second mobile phase ports of the cartridge, and wherein the cartridge is disposed vertically within the housing;

a central flange releasably disposed vertically to connect the tops and the bottoms of each of the first side and the second side of the housing, wherein the central flange is centrally disposed and configured to retain the cartridge within the housing when attached; and a first rail disposed beneath the first side and a second rail disposed beneath the second side, both the first and second rails being: (i) positioned perpendicular to the flange, and (ii) configured to enable the first side of the housing and the second side of the housing to slide away from each other in the opposing directions in response to the central flange being released, to enable inserting and removing the cartridge.

2. The chromatography housing system of claim 1, wherein the housing is made with one of a metal and a plastic.

3. The chromatography housing system of claim 1, wherein the housing is configured to withstand a pressure originating from within the cartridge of less than about 3 bar.

4. The chromatography housing system of claim 1, wherein the cartridge includes a chromatography medium.

5. The chromatography housing system of claim 1 further comprising a first leg positioned on the first side and a second leg positioned on the second side to provide structural support to the cartridge.

6. The chromatography housing system of claim 1, wherein the housing includes a lid.

7. The chromatography housing system of claim 1, wherein the first port and the second port of the housing are configured to substantially respectively align with the first and second mobile phase ports of the cartridge.

8. The chromatography housing system of claim 1, wherein the central flange is one of a bolt and a clamp.

9. The chromatography housing system of claim 1, wherein the housing is made of stainless steel.

* * * * *